United States Patent [19]
Fukuzawa et al.

[11] Patent Number: 5,502,565
[45] Date of Patent: Mar. 26, 1996

[54] METHOD AND APPARATUS FOR MEASURING THE FLYING HEIGHT OF A MAGNETIC HEAD ABOVE A DISK SURFACE AT THREE WAVELENGTHS

[75] Inventors: Tadashi Fukuzawa, Tokyo; Teiji Hisano; Tetsuji Morita, both of Fujisawa; Koichi Ikarugi, Chigasaki, all of Japan

[73] Assignee: International Business Machines Corporation, Armonk, N.Y.

[21] Appl. No.: 293,010

[22] Filed: Aug. 19, 1994

[30] Foreign Application Priority Data

Aug. 19, 1993 [JP] Japan .................................... 5-205308

[51] Int. Cl.$^6$ ........................................... G01B 9/02
[52] U.S. Cl. ............................. 356/357; 356/361
[58] Field of Search .......................... 356/357, 358, 356/345, 361

[56] References Cited

U.S. PATENT DOCUMENTS

| | | | |
|---|---|---|---|
| 4,593,368 | 6/1986 | Fridge et al. | 356/357 |
| 5,218,424 | 6/1993 | Sommargren | 356/358 |
| 5,280,340 | 1/1994 | Lacey | 356/357 |
| 5,311,287 | 5/1994 | Amer | 356/373 |

OTHER PUBLICATIONS

J. M. Fleischer et al., "Infrared Laser Interferometer for Measuring Air–bearing Separation", IBM J. Res. Develop., Nov., 1974, pp. 529–533.

T. Ohkubo et al., "Accurate Measurement of Gas–Lubricated Slider Bearing Separation Using Visible Laser Interferometry", Journal of Tribology Transactions of the ASME, vol. 110, Jan. 1988, pp. 148–155.

D. L. Lipschutz, "Dynamic Measurement of Small Separations by a Light Interference Method", IEEE:Proceedings of the International Conference on Magnetic Recording, London, Jul. 1964, pp. 87–90.

A. Nigam, "A Visible Laser Interferometer for Air Bearing Separation Measurement to Submicron Accuracy", Journal of Lubrication Technology Transactions for the ASME, vol. 104, Jan. 1982, pp. 60–65.

Primary Examiner—Samuel A. Turner
Assistant Examiner—Robert Kim
Attorney, Agent, or Firm—Joseph F. Villella, Jr.; Paik Saber

[57] ABSTRACT

This invention provides a method and apparatus for accurately measuring the flying height of a magnetic head at high speed by using a white lamp and a color CCD camera. The invention entails substituting tentative refraction coefficients and extinction coefficients representative of colors in theoretical equations expressing the relationship between interference light intensity and flying height, thereby optimizing the parameters by non-linear regression. The flying height of a magnetic head is measured by using the coefficient thus determined. Also, this invention enables determination of flying height at very high speed through effecting the above optimization in consideration of constants associated with the shape of the head under consideration, and adapting the above theoretical equations.

6 Claims, 10 Drawing Sheets

METHOD AND APPARATUS FOR MEASURING THE FLYING HEIGHT OF A MAGNETIC HEAD ABOVE A DISK SURFACE AT THREE WAVELENGTHS

DESCRIPTION

1. Technical Field

This invention relates to a method and apparatus for measuring the flying height of a magnetic head at high speed by using an optical interference system.

2. Background Art

A flying height tester (FHT) for evaluating the flying height of a magnetic head for magnetic disks is an important device indispensable for the development and manufacture of magnetic heads. Various testers have been developed so far. Among them, FHTs using optical interference for the measurement of flying height are widely and commonly used in production lines because they are of the non-contact type and need no electrical connection.

FHTs of this type employ fused quartz disks instead of magnetic disks. Such FHTs estimate flying height by measuring interference colors developed due to the multiple interference effect produced across a narrow gap, about 100 nm in width, formed between the disk and the magnetic head. This method in principle is capable of providing very accurate measurement, yet it presents some problems.

The following describes the principle of optical determination of the flying height of a magnetic head with reference to FIG. 17. According to this figure, there is a transparent fused quartz disk 1 facing a magnetic head 3 in a flying state at a distance, d across air gap 2. There is also an incident ray 4 entering air gap 2 at an incidence angle, $\Theta_1$, from the fused quartz disk 1, a ray which is then refracted at an angle, $\Theta_2$ before entering the head 3 at the same angle, $\Theta_2$. Part of the ray 5 enters the head 3 at an incidence angle, $\Theta_3$, and is then absorbed in the head 3. The rest of the ray is reflected off the head 3 and is split at the surface of the fused quartz disk 1 into the re-reflected ray 7 and the ray 6 which enters the fused quartz disk 1. Rays taking different optical paths undergo modulation in light intensity by their interference effect.

FIG. 1 represents the intensity of reflected light modulated in light intensity as a function of light wavelength and gap width (flying height). Provided that all optical constants of the measurement system, including the refraction coefficient and extinction coefficient of the surface of a magnetic head have been determined over the required wavelength band and the spectral sensitivity characteristics of a light source, and that an optical detector and an spectrometer are already known, the intensity of a reflection spectrum as shown in FIG. 1 can be uniquely obtained by applying theoretical Equation 1 below.

$$g(\lambda, \chi) = \left| \frac{r_{12} + r_{23} e^{-2i\phi}}{1 + r_{12} r_{23} e^{-2i\phi}} \right|^2 \qquad \text{Equation 1}$$

wherein, $$\phi = \frac{2\pi\chi}{\lambda} n_2 \cos\theta_2 \qquad \text{Equation 2}$$

and, $$r_{12} = \frac{K_{1\chi} - K_{2\chi}}{K_{1\chi} + K_{2\chi}} \qquad \text{Equation 3}$$

and, $$r_{23} = \frac{K_{2\chi} - K_{3\chi}}{K_{2\chi} + K_{3\chi}} \qquad \text{Equation 4}$$

and, $$K_{j\chi} = \frac{\omega}{c} n_j \cos\theta_j \qquad \text{Equation 5}$$

(j = 1, 2, 3)

n1, n2, and n3 denote the complex refraction coefficients of a fused quartz disk, air, and a magnetic head, respectively; $\lambda$, light wavelength; x=d at the air gap length or flying height; c, light velocity; $\omega$, angular frequency of incident light; r12, reflection factor at the disk/air interface; r23, reflection factor at the air/magnetic head interface, and $K_j$, x-component of a light wave vector.

Provided that such functions have been provided in advance, an unknown flying height can be determined accurately through comparison with the interference color of the magnetic head flying above the fused quartz disk at an unknown height.

There are two possible methods of flying height determination: one entails measuring the reflection spectrum of the head in its flying state and selecting a suitable flying height giving the same shape as that spectrum from a known spectrum group; the other entails focusing attention on some rays of particular wavelengths and calculating the flying height of the magnetic head from a combination of the reflected light intensity values of the respective rays. The former is known as the spectrum evaluation method. The latter is known as the three-wavelength method, because it employs three wavelengths for measurement.

The spectrum measurement method is characterized in that it can facilitate the judgment of flying height because it can avoid assigning the same spectrum shape to different flying height values if the appropriate wavelength band is selected. For this reason, most FHTs usually employ this method. However, to derive such functions by calculation, it is necessary to determine in advance all the optical constants of the measurement system, or the refraction coefficient and extinction coefficients of the surface of the magnetic head, over the required wavelength band and also to clarify in advance all the spectral response of the light source, optical detector, and spectrometer in use, as described before. Such measurement requires expensive optical instruments and high-sensitivity measurement technologies and is unsuitable as a method of calibrating apparatus installed for making continuous evaluations in production lines, because these constants differ from one head to another and it must also be taken into consideration that the light source may deteriorate with the lapse of time during measurement.

Moreover, the lowering of flying height ascribed to the increasingly higher packaging density of the magnetic disks lessens the changes in the shapes of spectra, which makes it still more difficult to judge flying height. Within a flying height range 50 nm to 100 nm, there is little change in the shapes of spectra observed in the visible radiation band, though there is change in offset components alone. Because this method estimates flying height from the shape of a spectrum, there are fundamental difficulties in applying this method to cases where there is only minor change in the shapes of spectra.

On the other hand, the three-wavelength method only requires a smaller overall amount of data to be prepared than the spectrum evaluation method. This method enables unique determination of flying height from a combination of reflected light intensity values giving the same flying height by employing monochromatic rays with three different wavelengths. For instance, to obtain data for measurement of a flying height of up to 100 nm with a resolution of 1 nm, the spectrum evaluation method entails storing 100 functions in advance whereas the three-wavelength method entails storing only three functions.

According to this method only a relatively small number of optical constants are required. However, it is burdensome to operators to measure optical constants each time a change is made from one type of head to another. In other words, it is necessary to measure optical constants by using a standard sample whose gap length is already known beforehand when the material of the head is changed, e.g., one mode by sticking a head on a glass disk with a certain gradient, in which case, however, the fabrication accuracy of the gap section related to the standard sample becomes problematic as the flying height lowers. Additionally other problems, such as improper gap length due to moisture coagulation on the gap section, may arise. Hence, this method as well is incapable of coping with the gap length measurement of magnetic heads working at a lower flying height.

Moreover, the optical interference system of an FHT involves two uncertainties, i.e., the non-uniqueness of a measurement and its dependence on unobservable unknown parameters. Both uncertainties synergetically affect each other to create difficulties for calibrating the flying height and thereby lower the accuracy in the low flying height band. The non-uniqueness of measurement as referred to here is the attainment of two or more results of flying height estimation from certain measurement data. It follows that it is necessary to choose one of two or more such results of flying height estimation under appropriate constraint, the choice of which presupposes predictive information and the user's judgment and may sometimes end in failure. This problem is essentially ascribed to the periodicity of interference phenomena, which invited an increase in the cost of devices insofar as spectra of reflected light were usually measured to avoid this problem.

The dependence on unobservable unknown parameters, on the other hand, refers to the necessity of estimating flying height by reverse operation with the assumed values of such difficult-to-know-directly parameters as the complex refraction coefficient (refraction coefficient and extinction coefficient) of a head to be measured, and the gains and offsets of light intensity sensing devices (photo diodes, CCD arrays, etc.) In practice, it is often difficult to measure those parameters accurately, and therefore it is nearly impossible to cope with temporal fluctuations in the parameters of measurement instruments and the dispersion of heads to be measured even if measurement should be possible. Hence, the determination of flying height on the basis of such assumed values leads to the occurrence of errors.

Several problems may arise if an algorithm involving uncertainties in an assumption for determination of flying height is used. For instance, FIG. 2 shows the correlation between flying height (FH) and the rotational frequency of a fused quartz disk. Insofar as the flying height increases linearly as the rotational frequency increases, it appears as if a correct result were produced. However, if a crown (a constant denoting the convexity of a magnetic head slider) is measured at the same time, different results can be obtained depending on the rotational frequency (as shown in FIG. 3). Since a crown is uniquely determined by the shape of a magnetic head slider, it is contradictory that such data dependent on the rotational frequency can be obtained. This contradiction is ascribed to uncertainties in the above algorithm, that is, the function shown in FIG. 1 having been decided without correct information concerning the various optical constants.

As described above, when measuring the crown of a magnetic head slider, it is necessary to determine the flying height of the magnetic head over the entire area of the slider and then determine the crown between several nm and several tens of nm. Since the slider is flying obliquely, it is necessary to restrict a range from 100 nm to 500 nm for the flying height of the gap section of a magnetic head. For this reason, the linearity of the algorithm for this flying height measurement plays an extremely important role.

SUMMARY OF THE INVENTION

Thus, one object of this invention is to provide a signal processing algorithm capable of obtaining an accurate flying height by removing various uncertainties in an FHT using an optical interference system without imposing any burden on the operator.

The invention discloses a method for measuring the flying height of a magnetic head using a three-wavelength system as an optical interference system.

First, the intensity of interference light due to a gap between the head and the disk is measured with an RGB camera having definite spectral characteristics with respect to each of the colors RGB by using a white lamp as a light source.

Then, assuming a first refraction coefficient and a first extinction coefficient common to each of the RGB the first refraction coefficient and the first extinction coefficient are substituted into a theoretical equation for deriving interference light intensity. Next an error between the result of the measurement and the result of calculations by the theoretical equation are determined for each of RGB by applying the least square method.

Subsequently, the first refraction coefficient and the first extinction coefficient are adjusted to another refraction coefficient and another extinction coefficient. Another determination is made, and a new refraction coefficient and a new extinction coefficient are chosen so as to minimize the error once again.

A final refraction coefficient and extinction coefficient are then found and substituted into said theoretical equation. Finally, the relationship between the flying height of a magnetic head and the interference light intensity of each of RGB is then determined.

In order to adapt this method to production lines, this invention also discloses a method for measuring the flying height of a magnetic head using an optical interference system and a white lamp as a light source. This is done by specifying a parameter group and measuring the flying height by using the parameter group thus specified. The parameter group specification entails adopting, as a parameter group, constants relevant to a theoretical equation for deriving interference light intensity and constants relevant to a polynomial expressing the shape of the magnetic head, and then measuring the strength of interference light emitted due to a gap between the flying head and the disk. This light is measured with an RGB camera having definite spectral characteristics with respect to each of RGB, carrying out the measurement at two or more rotational frequencies of the disk, and, optimizing the parameter group by applying a nonlinear regression method so that the error between theoretical interference light intensity obtained by substituting tentative parameter group into said theoretical equation and measured interference light intensity is minimized. Finally, the flying height is determined by substitution of the optimized parameter group into the theoretical equation, thereby representing the flying height of the head in a flying state in the form of a continuous curve in a functional relationship to flying displacement from the disk.

BEST MODE FOR CARRYING OUT THE INVENTION

Figure 1:
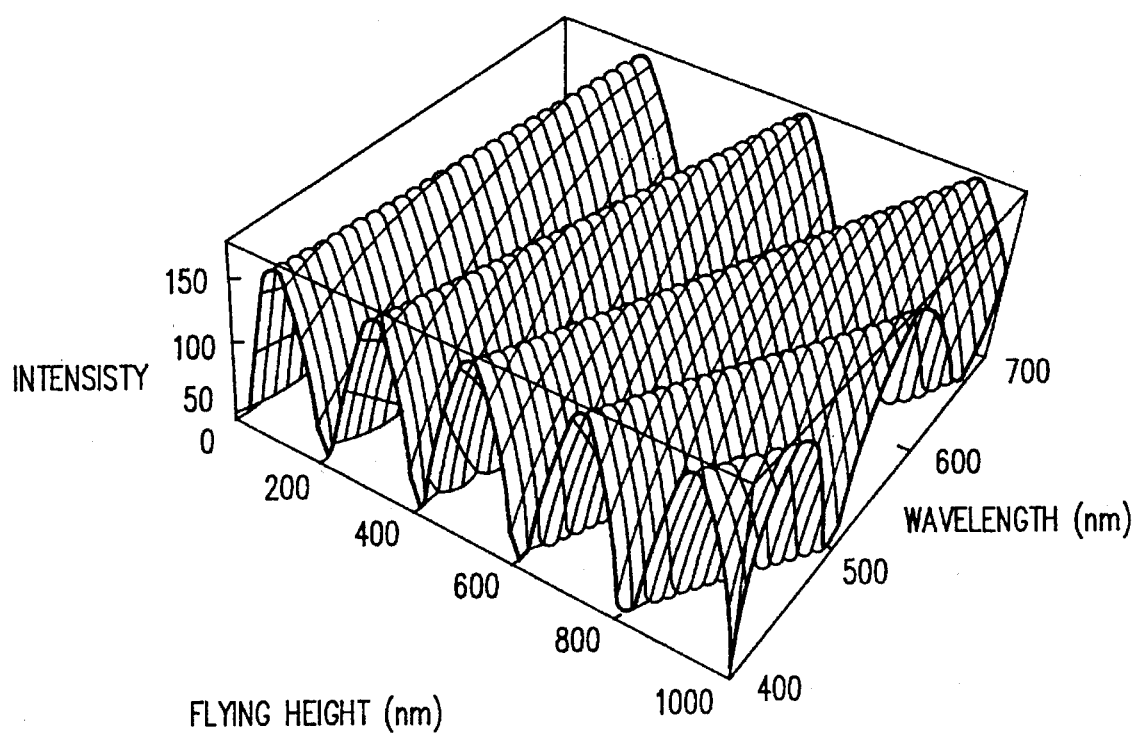
FIG. 1 shows a spectrum of interference light due to a diskhead gap.

This invention relates to a method for accurately determining the flying height of a magnetic head at high speed by describing the interference phenomena of a narrow gap, as shown in FIG. 1, formed between the magnetic head in its flying state and a fused quartz disk.

Figure 16A:
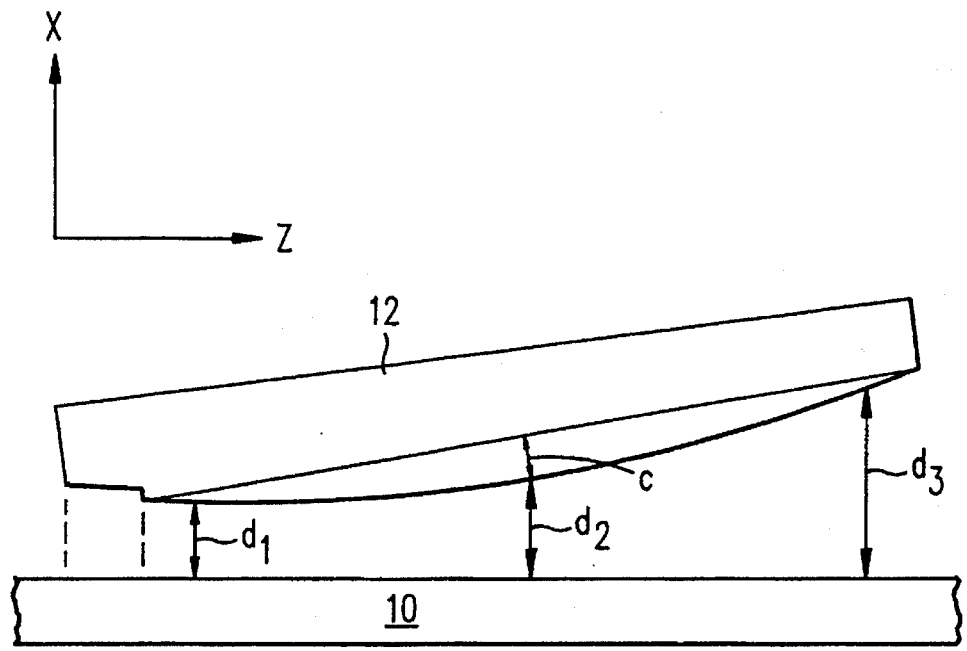
FIGS. 16a and 16b show a side view and a bottom view, respectively, of a slider to be measured.
Figure 16B:
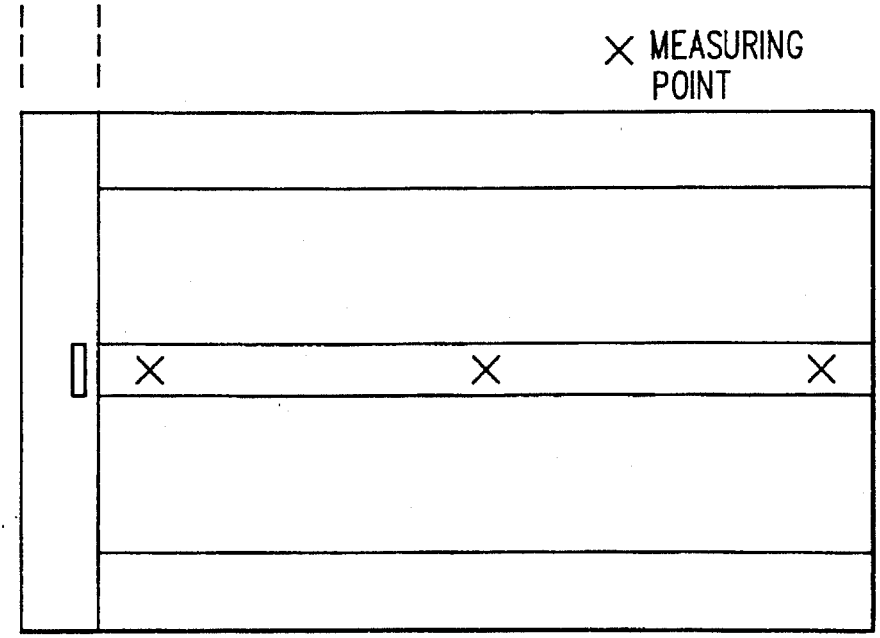

FIGS. 16a and 16b show a side view and a bottom view of a magnetic head 12 in its flying state. The head flies in a steady state under the influence of wind pressure from the disk. In the following explanation, the x-axis and z-axis are set in the directions indicated in FIG. 16a. The flying height to be measured is the point-to-point distance between the head 12 and the disk 10. The flying height of the head 12 is represented as a curve by using data concerning the shape of the head 12. Again, the concept "crown" used in the following is nothing but a quantitative representation of the "warpage" of the head 12, as explicitly shown in FIG. 16a.

Figure 4:
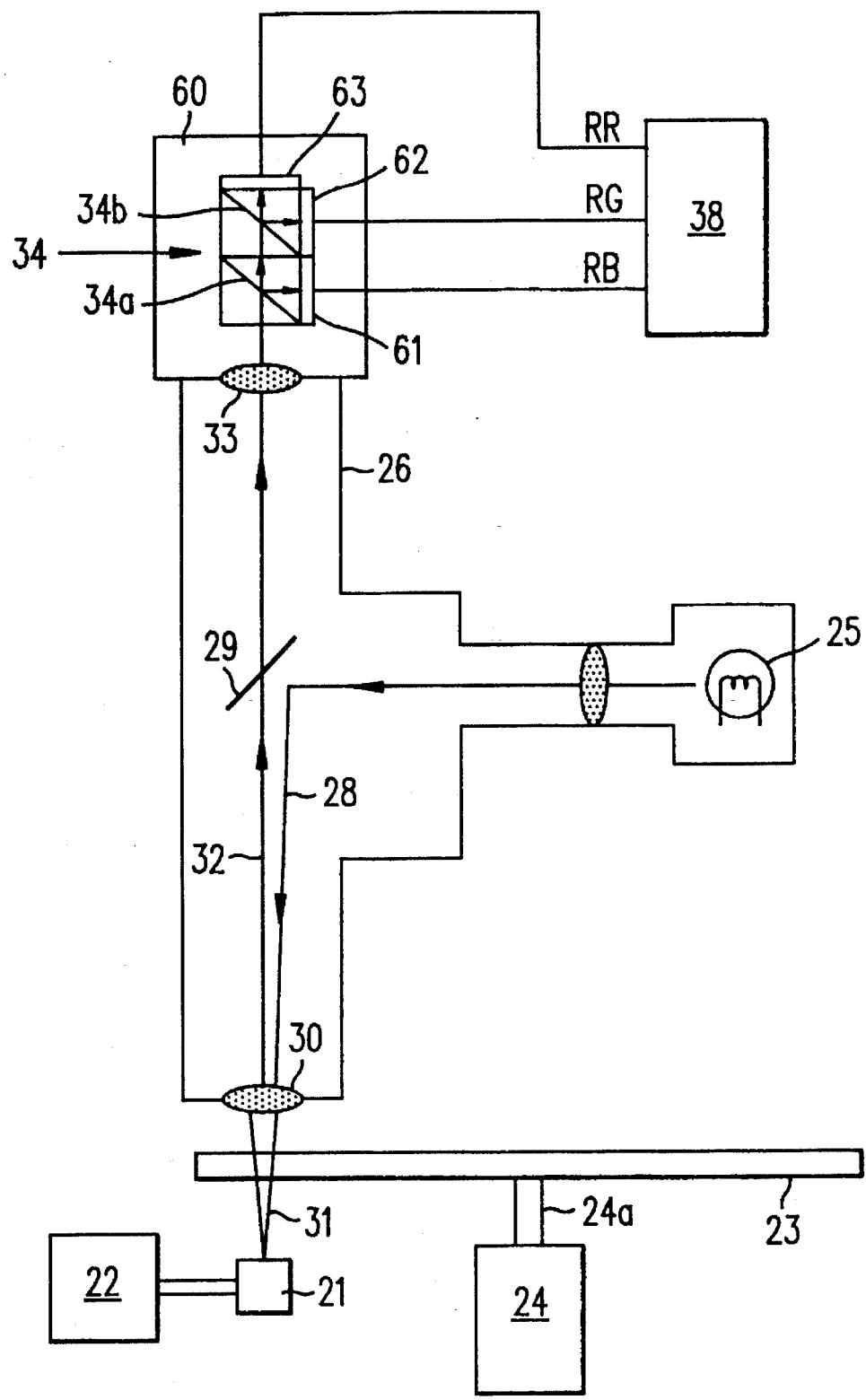
FIG. 4 shows the measuring apparatus of this invention.

FIG. 4 is a conceptual drawing of the measuring apparatus used in a preferred embodiment. The flying height (FH) to be measured is the gap 31 between a fused quartz disk 23 which is mounted on spindle 24a and driven by a motor 24 and a magnetic head 21. Light emitted from a tungsten halogen lamp 25 is repeatedly directed to gap 31 along path 28 and through lens 30 and reflected across the gap 31 in the optical system of a microscope 26 and assumes a definite interference color according to the flying height of the head. The reflected light through lens 30, along Path 32, and lens 33 is taken in as image information through a color TV camera 60 fixed on the head of the microscope 26. In this embodiment, TV camera 60 comprises mirror array 34 having mirrors 34a and 34b and three CCD image pickup arrays 61, 62, and 63 which are assigned respectively to the three colors, RGB. The three signals, RR, RG, and RB, are reprocessed in an image processing card before they are processed by a computer 38.

Figure 5:
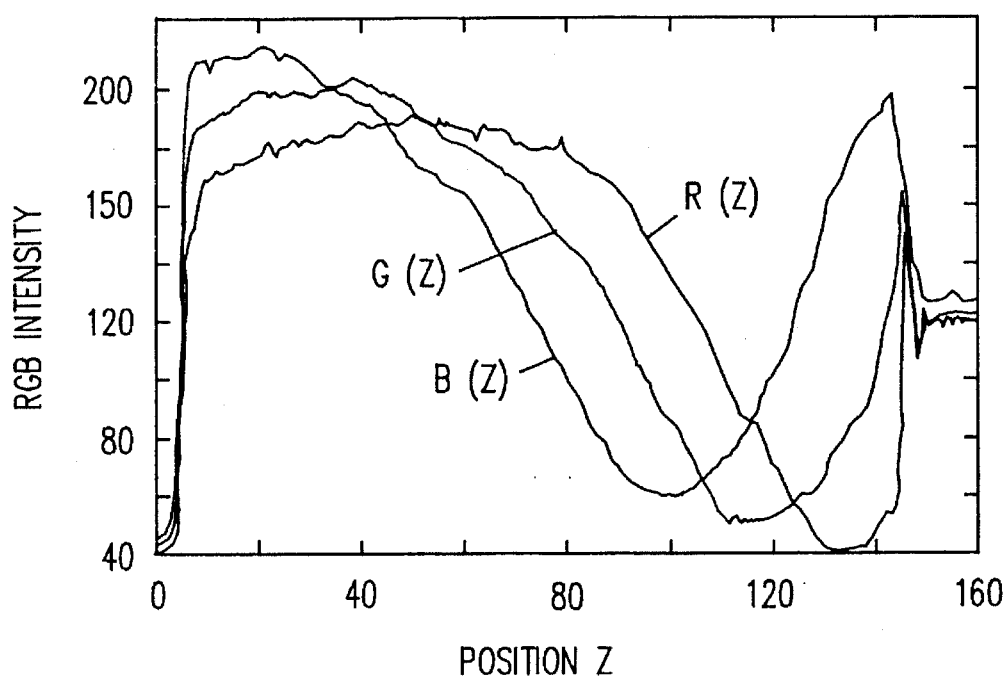
FIG. 5 shows a result of interference light measurement.

FIG. 5 represents the signal intensities of each of the colors RGB as a function of sliding surface position z when the interference color of the center rail section of the sliding surface of a magnetic head is acquired one-dimensionally through a TV camera. The center rail is a sliding surface smoothly formed from one end to the other end of the head. The read/write gap of the magnetic head is situated at one end of this rail. In this drawing, there is a magnetic gap on the left-hand side. The RGB signals are handled with the mean of 8×8 pixels as one unit. These signals are quantized from 0 to 256 by an image card.

The values shown in FIG. 5 must be preprocessed before being used for the calculation of flying height. In this case, what is particularly problematic is distortion due to the acquisition of data in two-dimensions. This distortion is ascribed to the intra-surface distribution (shading) of image pickup elements in the TV camera involved and the illumination inhomogeneity of the microscope optical system involved. In order to correct this distortion, a uniform white plate was illuminated in the working state and the RGB signal strength at each point was measured and recorded with a camera. Then, this distortion was eliminated by multiplying the signal strength shown in FIG. 5 by the correction factor of intra-surface distribution of pixels.

In a conventional flying height measurement apparatus, the one-point data acquired usually undergoes spectral analysis to obtain signals according to respective wavelength components, which then undergo numerical analysis. In this method, instead of having to worry about the distortion peculiar to such two-dimensional data acquisition as mentioned above, there is a need to obtain two dimensional data on the slider by moving the whole optical measurement system mechanically, which unavoidably leads to larger apparatus, higher prices, and longer measurement time. In the preferred embodiment, by contrast, the need to move the whole optical measurement system mechanically is obviated because a screenful of data is acquired two-dimensionally at a time.

Subsequently, the dark current flowing in the CCD image pickup elements and the DC components of the image card were eliminated. The RGB signals were measured with the shutter of the camera closed and were deducted as DC components.

The RGB signals thus reprocessed can be described as a function of flying height through determining some unknown parameters included in Equations 1 to 5, previously described. FIG. 1 shows an application of these equations to single-wavelength light. In this embodiment, the RGB signals from a TV camera are acquired, and the rays of light which have passed through the filters corresponding to the respective colors of RGB are all aggregated to form corresponding color signals.

Figure 6:
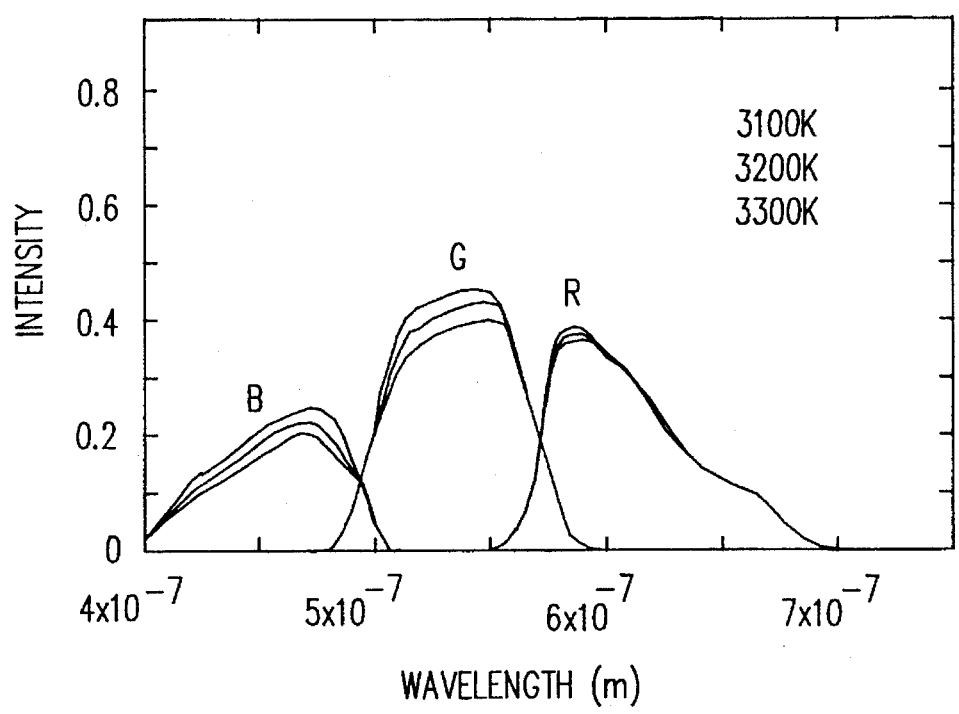
FIG. 6 shows the spectral characteristics of the RGB camera used for measurement.

FIG. 6 shows the spectral characteristics of the filters of the TV camera used here. These characteristics also include correction by differences in color temperature of the light source and the spectral sensitivity characteristics of CCD image pickup elements.

The following deals with one of the three sorts of RGB output, e.g., R (red) output. Since R output is an electrical signal that is a transformation of interference reflected light from the head-disk air gap which has passed through the R filter, its magnitude is the integrated intensity of the monochromatic reflected rays of each wavelength weighted by the spectral response of the R filter. Letting an overall spectral response, inclusive of the spectra of the R filter and the light source, be $SR(\lambda)$ and a head-disk air gap interference reflection factor for monochromatic light of wavelength $\lambda$ be $g(\lambda, x)$, R output yR is expressed as follows:

$$yR = \int_{\lambda_1}^{\lambda_2} SR(\lambda) \cdot g(\lambda, x) d\lambda, \text{ where}$$

$g(\lambda, x)$ is obtained by substituting a refraction coefficient and extinction coefficient in Equations 1 to 5. The refraction coefficient and extinction coefficient are greatly dependent on wavelength and hence have a great effect on the results of flying height calculation as far as the wavelength band under consideration is concerned. Therefore, in this respect, it is necessary to change refraction coefficients and extinction coefficients respectively with respect to all wavelengths within a given spectrum and substitute them in the equation. However this requires specifying a huge number of parameters. To avoid this difficulty, one can resort to approximation by assuming a refraction coefficient and an extinction coefficient as constants for each of RGB instead of as functions of wavelength $\lambda$. By introducing approximation, it is possible to reduce the hundreds of otherwise required parameters to three refraction coefficients (nr, ng, nb) and three extinction coefficients (kr, kg, kb).

Then, suitable initial values (n1, k1, n2, k2, n3, k3) are substituted for these six parameters and the calculation of Equations 1 to 5 is done. Three trial functions Tr(x), Tg(x) and Tb(x) are then provisionally determined as possible alternatives to an RGB function for each of RGB.

The data shown in FIG. 5 implies that a combination of the intensity values of R, G, and B is uniquely assigned to the position, z, of a slider. Therefore, if the unknown parameters of Equations 1 to 5 can be identified, the flying height of a head in position z can also be derived from a combination of the interference light intensity values of RGB.

An RGB function for a head actually in the flying state cannot directly be derived from FIG. 5 even after the above-described processing has been done, because every head has some crown and inclination. The measured values, Rs(z), Gs(z), and Bs(z), of the output intensity of RGB must take the combination Tr(x=d), Tg (x=d), and Tb (x=d) (where d=flying height), approximate to the signal strength combination Rs(a), Gs (a), and Bs(a) in a slider position z=a at any of the above-mentioned trial RGB functions, Tr(x), Tg(x), and Tb(x), in which case a has to be varied over the entire area of the slider. After doing this derivation and calculation, the absolute value of d (flying height) may be left unknown.

Now assuming that error as a function of z is expressed as:

$$E(z)=(Tr(x)-Rs(z))^2+(Tg(x)-Gs(z))^2+(Tb(x)-Bs(z))^2$$

we then search for a particular d such that E(z) is minimized and let the corresponding E(z) be Em(z). We then determine Em(z) over the entire range of z and let the sum be TEm(n1, k1, n2, k2, n3, k3). Then, by varying six parameters n1, k1, n2, k2, n3, k3, we find a combination of n1, k1, n2, k2, n3, k3 such that total error TEm is minimized. This process is a process of optimizing the parameters of Equations 1 to 5 for consistency with measured values. Thus, the correct RGB function is determined when a combination of n1, k1, n2, k2, n3, k3, such that TEm is minimized, is substituted in Equations 1 to 5.

Figure 7:
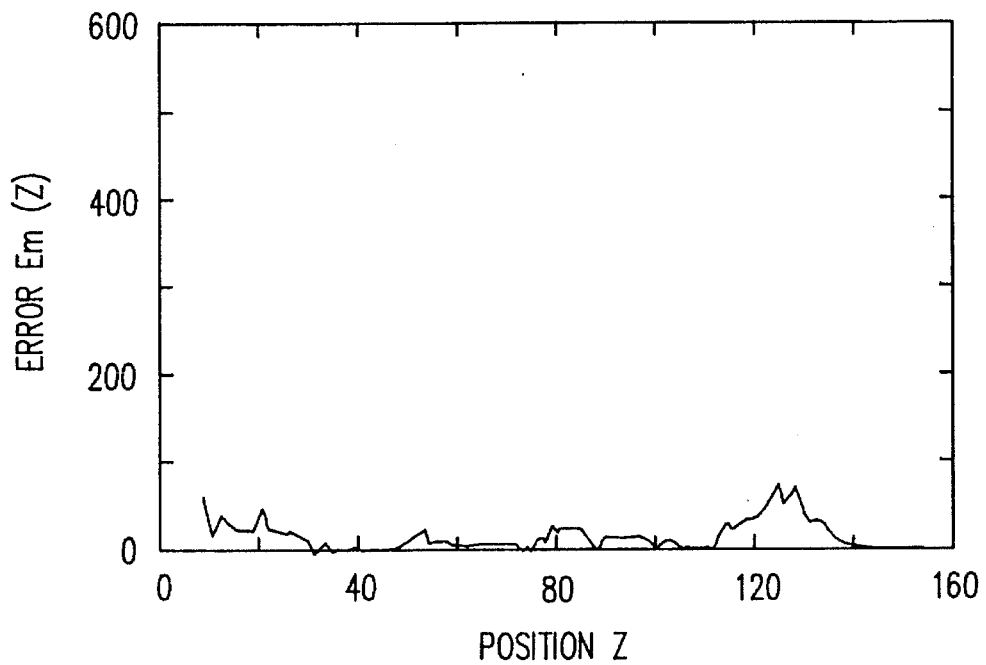
FIG. 7 shows the error during parameter optimization.

FIG. 7 shows Em(z) calculated as a function of z using a combination of n1, k1, n2, k2, n3, k3 such that TEm is minimized. In this way, Em(z) can be extremely lowered by selecting particular parameters.

Figure 8:
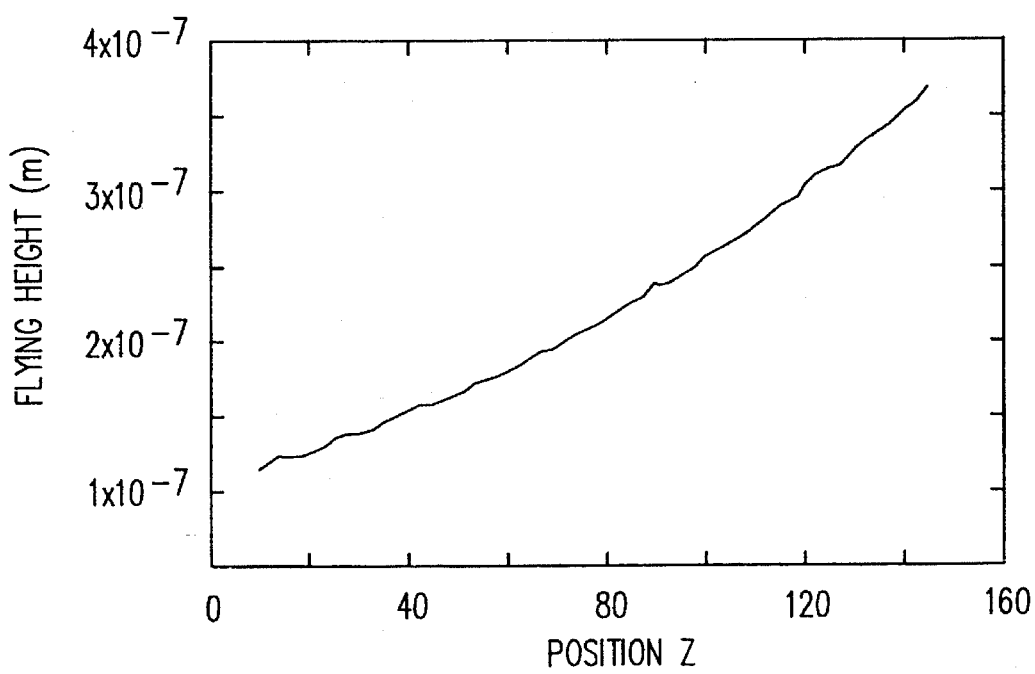
FIG. 8 shows the flying height during parameter optimization.

FIG. 8 shows flying height (FH) determined using the least square method in correspondence to the data, Rs(z), Gs(z), and Bs(z), shown in FIG. 5. This data, which has been reprocessed according to the deterministic RGB functions, Tr(x), Tg(x), and Tb(x) is determined by substituting the parameters thus obtained in Equations 1 to 5. As FIG. 8 shows, the measured results of flying height in each position of a slider are smooth and in accord with the actual shape of the slider. This fact proves that the method for measuring the flying height of a magnetic head proposed by this invention is accurate and the pertinent algorithms themselves are correct since they are excellent in linearity.

Figure 9:
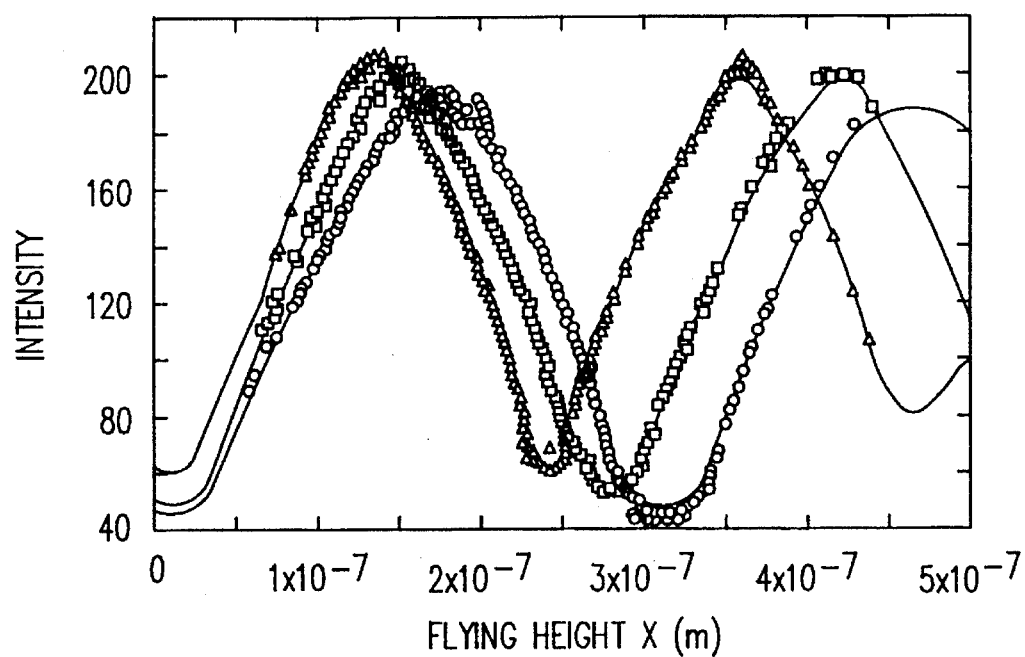
FIG. 9 shows the correspondence between a theoretical curve and measured values during parameter optimization.

FIG. 9 shows the relationships between measured values Rs(z), Gs(z), and Bs(z), determined RGB functions Tr(x), Tg(x), and Tb(x), and flying height x. In this figure, the circle, square, and triangle represent Rs(z), Gs(z), and Bs(z), respectively. As evident from this figure, the measured values are consistent with the theoretical values.

Figure 10:
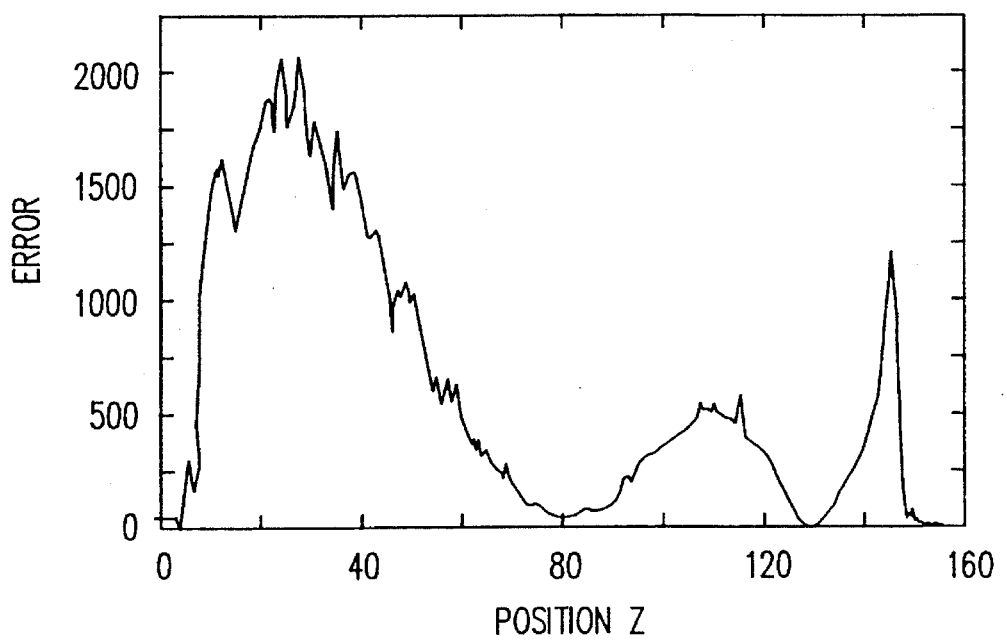
FIG. 10 shows the error during improper parameter optimization.
Figure 11:
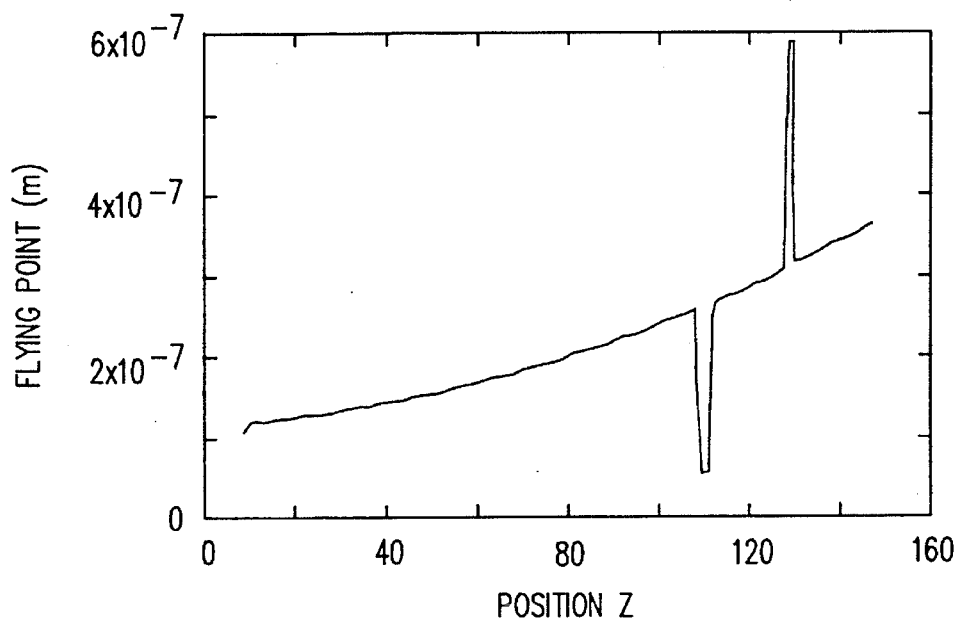
FIG. 11 shows the flying height during parameter optimization.

FIG. 10 shows an example of Em(z) calculated as a function of z using a combination of n1, k2, n2, k2, n3, k3 such that TEm is not minimized, that is, not optimized. FIG. 11 shows the flying height in each position of the same slider derived from RGB function Tr(x), Tg(x), and Tb(x) calculated using the above combination of n1, k1, n2, k2, n3, and k3. In this case, there are discontinuous locations in the shape of the slider that should originally be smooth. This fact suggests that this example of calculation is invalid in spite of the appearance suggesting it partially gives a correct flying height. In brief, the process of optimizing n1, k1, n2, k2, n3, k3 acquires utmost importance for the attainment of correct results of calculation.

Subsequently, we acquired the data shown in FIG. 5 by varying the rotational frequency of the disk. The crown of a slider derived from the measured values of a flying slider shape while the disk was rotating at 3200 rpm, 3600 rpm, 4000 rpm, or 4400 rpm was maintained at 31 nm within ±1 nm. The values of n1, k1, n2, k2, n3, and k3 used then were those that were measured at 3600 rpm in another case as shown in FIG. 5. The flying height of each part of a slider increases with the rotational frequency, but the crown itself remains constant independent of the rotational frequency. Therefore, the fact that the crown values obtained at different rotational frequencies thus agreed with one another proves the validity and excellent linearity of this evaluation algorithm.

The method employed in the preferred embodiment has been derived from the basic principles of physics, and the relevant optimum values were determined by using some physical quantities, such as refraction coefficients and extinction coefficients, as parameters. Accordingly, this method has the advantage that it is easy to follow by physical intuition. In actual production processes, however, it may often be unnecessary to determine flying height to such a wide extent, and hence it is permissible to use approximate forms for certain functions, whereby optimum values can be determined by applying more simplified techniques to heighten calculation speed. From this point of view, the following explains how to determine the required parameters as unknown parameters by non-linear regression through approximating RGB functions to non-linear functions. An alternative embodiment of the invention also employs a white lamp as the light source and a color CCD camera as the light receiver for obtaining position information.

However, the alternative embodiment does not use a one-point measurement to exclude non-uniqueness. It determines interference light intensity on a single screen over the entire area of a slider, and applying the relationship between adjacent measuring points by using a polynomially approximated slider shape vector, b, obtains flying height in the form of a curve (slider profile) of displacement from the disk. Further, this alternative embodiment optimizes parameters by the slider shape vector, b, and non-linear regression with a group of optical system parameters as an unknown parameter vector, p, whereupon measurement and calibration (tuning) are carried out simultaneously using data consistency.

The alternative embodiment operates in a calibration phase and a measurement phase. In the calibration phase, a significant amount of measurement data, corresponding to varied disk rotational speeds, is used to identify all unknown parameters over a wider measurement range. In the measurement phase, by contrast, the profile of the head in its flying state is estimated while drifting parameters alone are tuned using data at a particular rotational speed.

The reflection factor of a head-disk air gap for monochromatic rays of light of a wavelength, $\lambda$, is rewritten as follows:

$$g(\lambda, x) = r1 \cdot (1 - r3 \cdot \cos(ax - \phi))/(1 - r2 \cdot \cos(ax - \phi))$$

where $a = 4\pi/\lambda$, and $r1$, $r2$, $r3$, and $\phi$ are constants determined depending on the refraction coefficients of the head and disk in question. Since it is difficult to measure these constants accurately, and also some dispersion in the material properties of heads to be measured is expected, it is necessary to identify these constants as unknown parameters.

As has been described with respect to the preferred embodiment, one of the three sorts of RGB output, e.g., R(red) output yR, can be represented by the following equation:

$$yR = f(x) = \int_{\lambda_1}^{\lambda_2} SR(\lambda) \cdot g(\lambda, x) d\lambda$$

wherein $SR(\lambda)$ is an overall spectral response, inclusive of the spectra of the R filter and the light source, and $g(\lambda, x)$ is a head-disk air gap interference reflection factor. Since $SR(\lambda)$ assumes a complex shape, as shown in FIG. 6, it is extremely difficult to know its exact shape for each device and also the light source is liable to deteriorate with a lapse of time. However, this invention does not identify $SR(\lambda)$ over an entire spectrum, but reduces the number of parameters by representing a spectrum by two or three wavelengths. For example, where three-wavelength approximation is used, we have:

$$yR = fR(x) = wR \cdot g(\lambda R, x) + w1 \cdot g(\lambda R - \epsilon R, x) + w1 \cdot g(\lambda R + \epsilon R, x)$$

where $wR$, $\lambda R$, and $\epsilon R$ are unknown parameters and $w1 = (1 - wR)/2$.

Apart from the above, an actual measurement system has many other unknown parameters, such as a camera output gain for each of RGB, a DC offset, and shading dependent in gain on each camera image visual field (u). These parameters are hereinafter handled as an unknown parameter group represented by the following equation:

$$\vec{p} \qquad \text{Equation 6}$$

(Hereafter represented as vector p; the same also applies to the other symbols.) The function form under consideration is finally as follows:

$$yR = fR(p, u, x) = p1 \cdot (1 + p2 \cdot u + p3 \cdot u^2 +$$

$$p4 \cdot u^3) \cdot [p5 \cdot gR1 + (1 - p5)/2 \cdot (gR2 + gR3)] + p6$$

where $gR1 = (1 - p8 \cdot \cos(4\pi \cdot x/p10 - p9))/(1 - p7 \cdot \cos(4\pi \cdot x/p10 - p9))$ $gR2 = (1 - p8 \cdot \cos[4\pi \cdot x/(p10 - p11) - p9])/(1 - p7 \cdot \cos[4\pi \cdot x/(p10 - p11) - p9])$ $gR3 = (1 - p8 \cdot \cos[4\pi \cdot x/(p10 + p11) - p9])/(1 - p7 \cdot \cos[4\pi \cdot x/(p10 + p11) - p9])$ wherein, p1 is an overall gain (depending on light source intensity, CCD camera sensitivity, etc.), p2 to p4 are primary, secondary, and tertiary coefficients for shading correction, p5 is a central energy weight in three-wavelength approximation (Two-wavelength approximation applies when p5=0), p6 is an overall offset, which depends on disk surface reflection factors and CCD camera DC components, p7 to p9 are constants depending on head/disk refraction coefficients, p10 is a center wavelength in three-wavelength approximation, p11 is the difference between center wavelength and sideband-wave wavelength in three-wavelength approximation.

Therefore, thirty-three unknown parameters in total are required for RGB output, inclusive of the eleven parameters for R output. Since the shape of the function under consideration has thus been determined, it is then necessary to optimize unknown parameters in the following process using the error as an index.

FHT signal processing in the preferred embodiment is based on the concept of observing an RGB output vector, y, corresponding to a flying height vector, x, in a particular position of a head to determine an original flying height estimate vector, x. In this embodiment an RGB output vector from the head/slider is observed as a whole, and an estimate of a polynomial coefficient vector representing the original head profile is determined under the constraint that a set of relevant data elements should be in accord with the shape of the head. The influence of measurement error and random noise can be curbed and the integrity and accuracy of data required for identification of parameters can be ensured by using not one point but the whole. For instance, when attention is focused on one point only, there are two or more possible estimates of a parameter vector. However, estimation can be facilitated through narrowing down possibilities of a parameter vector satisfying the whole by using data about another two nearby points and imposing the constraint that their flying height varies linearly with respect to positional change, a constraint which is ascribed to the shape of the head. In practice, it has been confirmed that a head profile can be expressed accurately by a cubic polynomial without assuming linear change, so an estimate vector, b, corresponding to a polynomial coefficient vector is usually derived from multipoint data over the entire head/slider.

As previously stated, there are two phases, i.e., a calibration program phase and a measurement program phase. The measurement program represents a head profile in terms of a cubic polynomial function of slider position u, whereas the calibration program uses data obtained at two or more rotational frequencies as a set of measurement data elements to cope with the numerous parameters to be identified. In this case, disk rotational frequency v is used together with slider position u to give a polynomial approximation of a flying height profile on the u-v two-dimensional space. The coefficient vector is set as vector b, which is used as part of an unknown parameter together with other parameters to be identified by non-linear regression. The following describes examples of the composition of an approximate polynomial of a head profile concerning a measurement program and a calibration program.

Measurement program:

$$x(u) = b_1 + b_2 \cdot u + b_3 \cdot u^2 + b_4 \cdot u^3 \qquad \text{Equation 7}$$

Calibration program:

$$x(u,v) = b_1 + b_2 \cdot u + b_3 \cdot v + b_4 \cdot u^2 + b_5 \cdot uv + b_6 \cdot v^2 + b_7 \cdot u^3 + b_8 \cdot u^2 v + b_9 u v^2 \qquad \text{Equation 8}$$

As evident from the above, in this case, the dimension of coefficient vector b is 4 for the measurement program and 9 for the calibration program.

The following explains how to calculate flying height vector x from coefficient vector b for a calibration program. Now, let sampling points selected from among n points and m points as suitably divided points (both ends included) of u and v be $u_i$ and $v_j$, respectively, and its corresponding flying height be $x_{ij}$, in which case the division may be at regular or irregular intervals. Flying height vector x is composed by arranging a set of such $x_{ij}$ in proper order. Then we obtain the following results from determining $u_i$ and $v_j$ by varying i and j in the same order as the above and substituting them in Equation 7, thereby obtaining:

$$\begin{bmatrix} x_{11} = b_1 + b_2 \cdot u_1 + b_3 \cdot v_1 + b_4 \cdot u_1^2 + b_5 \cdot u_1 v_1 +, \ldots, + b_9 \cdot u_1 v_1^2 \\ x_{12} = b_1 + b_2 \cdot u_1 + b_3 \cdot v_2 + b_4 \cdot u_1^2 + b_5 \cdot u_1 v_2 +, \ldots, + b_9 \cdot u_1 v_2^2 \\ \vdots \\ x_{ij} = b_1 + b_2 \cdot u_i + b_3 \cdot v_j + b_4 \cdot u_i^2 + b_5 \cdot u_i v_j +, \ldots, + b_9 \cdot u_i v_j^2 \\ \vdots \\ x_{nm} = b_1 + b_2 \cdot u_n + b_3 \cdot v_m + b_4 \cdot u_n^2 + b_5 \cdot u_n v_m +, \ldots, + b_9 \cdot u_n v_m^2 \end{bmatrix}$$

This is expressed as below in vectorial notation:

$$\begin{bmatrix} x_{11} \\ x_{12} \\ \vdots \\ x_{ij} \\ \vdots \\ x_{nm} \end{bmatrix} = \begin{bmatrix} 1\, u_1 v_1\, u_1^2 u_1 v_1, \ldots, u_1 v_1^2 \\ 1\, u_1 v_2\, u_1^2 u_1 v_2, \ldots, u_1 v_2^2 \\ \vdots \\ 1\, u_i v_j\, u_i^2 u_i v_j, \ldots, u_i v_j^2 \\ \vdots \\ 1\, u_n v_m\, u_n^2 u_n v_m, \ldots, u_n v_m^2 \end{bmatrix} \begin{bmatrix} b_1 \\ b_2 \\ \vdots \\ \vdots \\ b_9 \end{bmatrix} \qquad \text{Equation 10}$$

Summarizing the above, we obtain:

vector x = H·vector b

The above matrix H can be easily calculated if all the sampling points of $u_i$ and $v_j$ are specified.

The measurement program also follows a procedure similar to the above, though the expressions are simplified because the required variable is u alone. In this case, an expression corresponding to Equation 9 is as follows:

$$\begin{bmatrix} x_1 \\ x_2 \\ \vdots \\ x_i \\ \vdots \\ x_n \end{bmatrix} = \begin{bmatrix} 1\, u_1 u_1^2 u_1^3 \\ 1\, u_2 u_2^2 u_2^3 \\ \vdots \\ 1\, u_i u_i^2 u_i^3 \\ \vdots \\ 1\, u_n u_n^2 u_n^3 \end{bmatrix} \cdot \begin{bmatrix} b_1 \\ b_2 \\ \vdots \\ b_4 \end{bmatrix} \qquad \text{Equation 11}$$

Although the form of Equation 10 is the same as that for the calibration program, matrix H is quite different from that for the calibration program and the dimensions of vectors x and b also are different from those for the calibration program, as is apparent from Equation 11.

Figure 12:
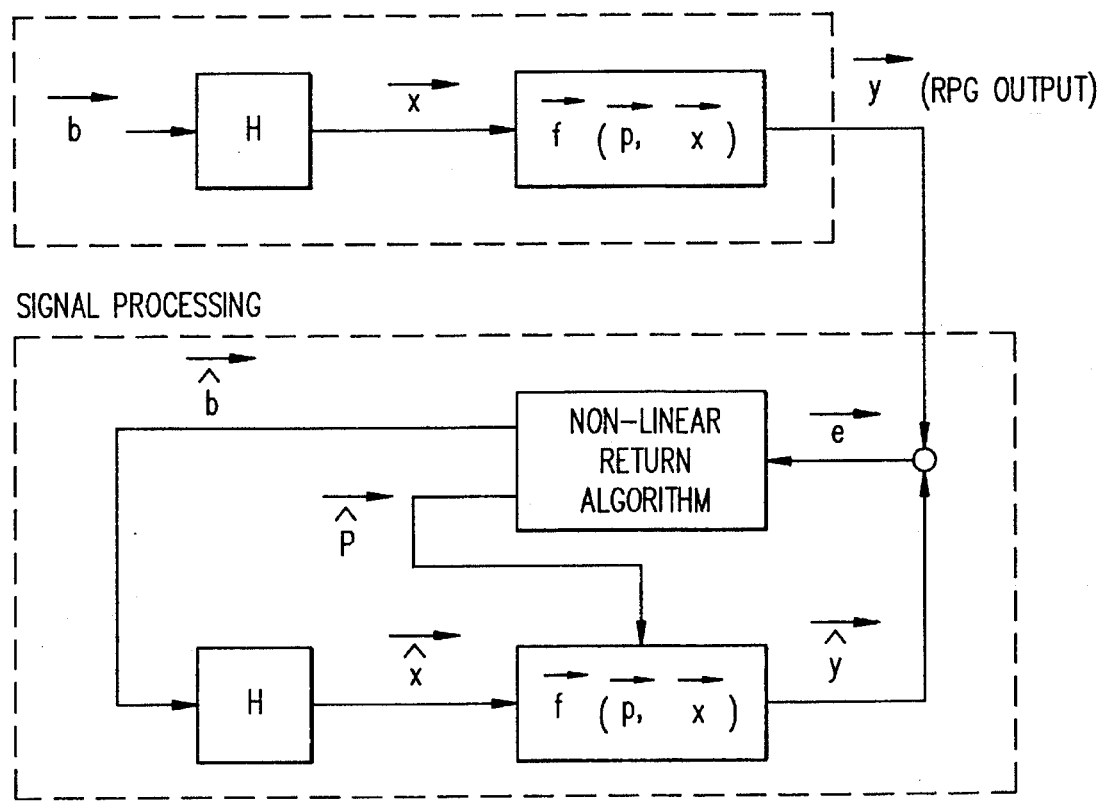
FIG. 12 is a block diagram of an algorithm for determination of flying height.

FIG. 12 is a block diagram representing the relationship between a modelled FHT and the proposed signal processing algorithm. In the FHT model section, shown at the upper part of this figure, vector b is a polynomial coefficient vector indicating a slider profile (a curve representing the bottom of a head in its flying state); vector x is a flying height vector in each position of the head; vector y is an RGB output vector in its corresponding position; and vector p is an unknown parameter vector. The form of f(p, x) is theoretically given by the above-described technique. H is also a known matrix for calculating vector x, a flying height vector in each position, from vector b, which is a polynomial Equation 9 coefficient vector. As described above, there is a relationship such that vector x=H·vector b. This part is an FHT model, and only vector y can be observed from the outside during actual measurement.

The lower part of FIG. 12 shows an adaptive signal processing algorithm for the above-described parameter estimation. The lowermost part of FIG. 12 shows the mathematical model of an FHT. A tentative FHT output vector, $\hat{y}$ is obtained by providing this mathematical model with an estimate of vectors b and p. The estimate of vectors b and p are both handled as parameters of the same level in the algorithm. The estimate of vectors b and p can be finally optimized by applying non-linear regression so that the square sum of the components of vector e, which is an error vector indicating a difference from vector y, which is an actually measured FHT output vector, can be minimized.

Figure 13:
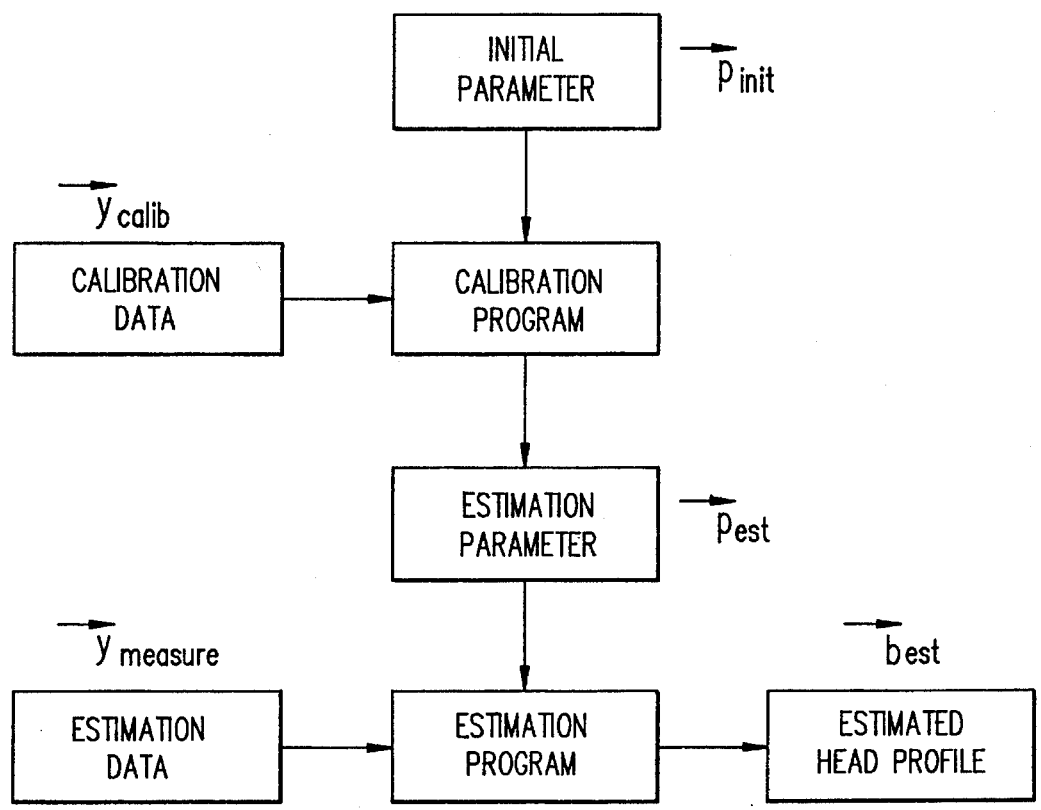
FIG. 13 is a flowchart of head flying height determination.
Figure 17:
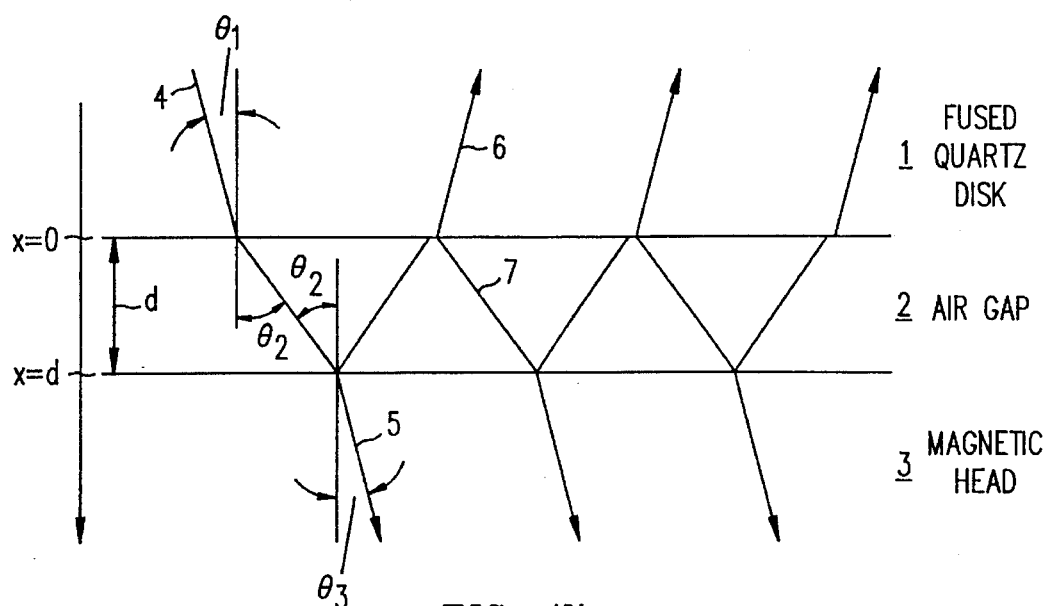
FIG. 17 is a drawing showing the principles of measurement of the flying height of a magnetic head.

FIG. 13 is a general data flowchart of signal processing using a signal processing system designed according to the block diagram in FIG. 12. This flowchart includes two processes, i.e., a calibration process and a measurement process. In the calibration process, each uncertain element of vectors b and p is estimated and optimized. In the latter process, flying height measurement is carried out by using the parameters thus optimized.

The calibration process identifies the optimum unknown parameter (estimation parameter) vector $P_{est}$ by applying non-linear regression to measurement data vector y and initial parameter vector $P_{init}$ when the rotational speed is varied. The corresponding output data is collected from a set of RGB output signals at many points on the slider with respect to one head at two or more rotational frequencies.

The measurement program obtains polynomial coefficient vector b from measurement data vector y and estimation parameter vector $P_{est}$. Measurement data has the same type of data as calibration data at only one disk rotational frequency. On this occasion, the estimation parameter is further regulated to determine vector b so that parameter drift during calibration or measurement can be compensated for. The vector b thus determined is then substituted in the equation vector x=H·vector b to determine the flying height of the head.

The calibration program has almost the same structure and functions as the measurement program. The only difference between the two is whether the input data disk rotational speed is singular or plural. As a device common to both programs, input data is smoothed by polynomial approximation with respect to slider position u, further reducing the number of data elements by sampling, and shortening calculation time. Moreover, parameters to be identified or regulated can be chosen freely by the operator upon execution. It is therefore possible to proceed without accessing value-determined, stable parameters, thus shortening calculation time. In practice, it is advisable to identify all parameters liable to fluctuation when new apparatus is first calibrated, whereas in subsequent periodic calibrations or measurement, only parameters liable to fluctuation such as gains and offsets should be identified. A modified Newtonian method, which is quicker in convergence than some other non-linear regression techniques, was used in those calibrations and measurement.

Figure 2:
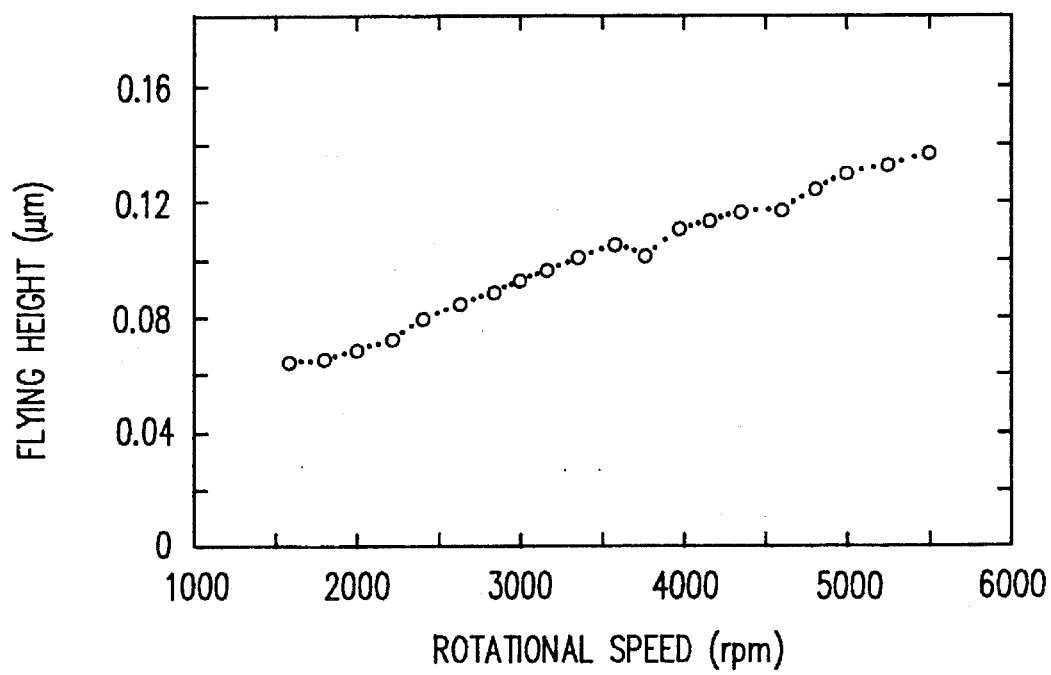
FIG. 2 shows the correlation between disk rotational speed and head flying height for a conventional algorithm.
Figure 3:
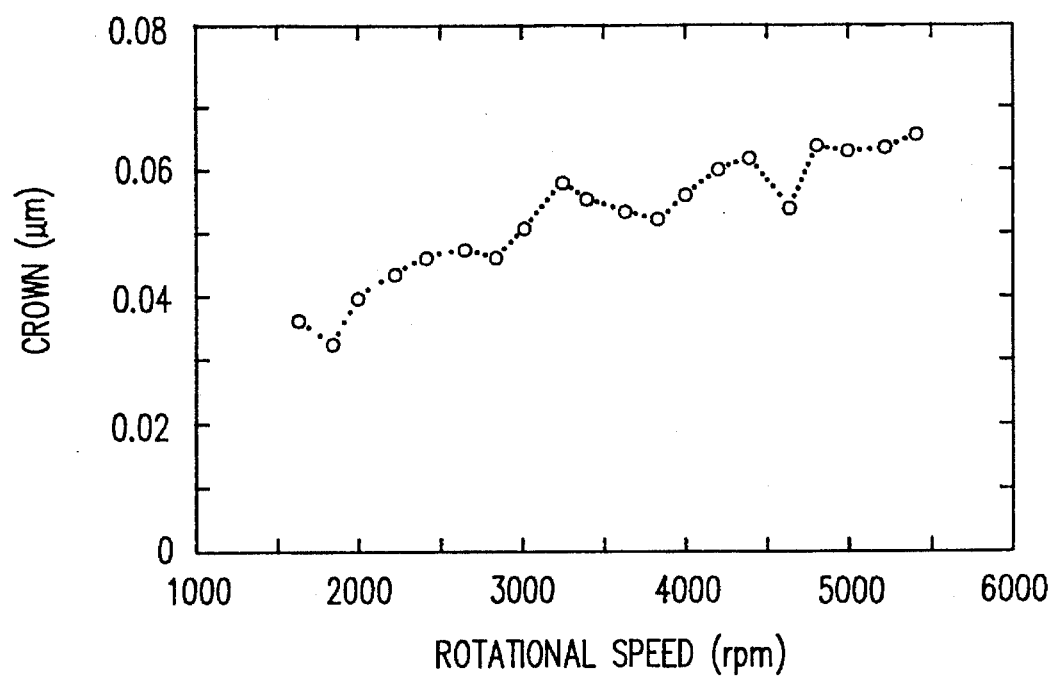
FIG. 3 shows the correlation between disk rotational speed and crown for a conventional algorithm.
Figure 14:
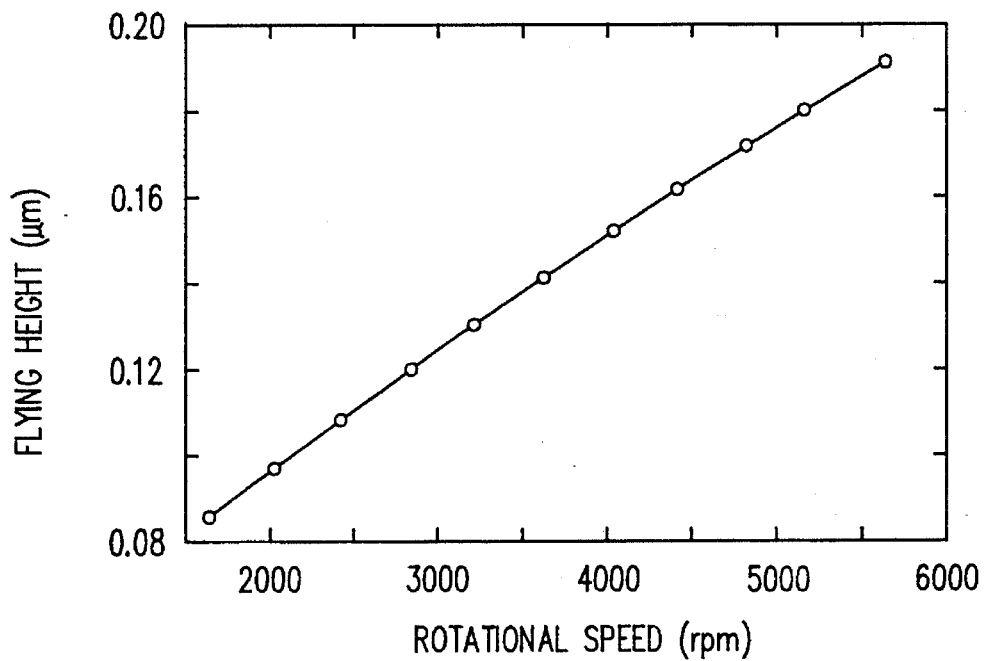
FIG. 14 is a diagram showing the correlation between flying height and disk rotational speed.
Figure 15:
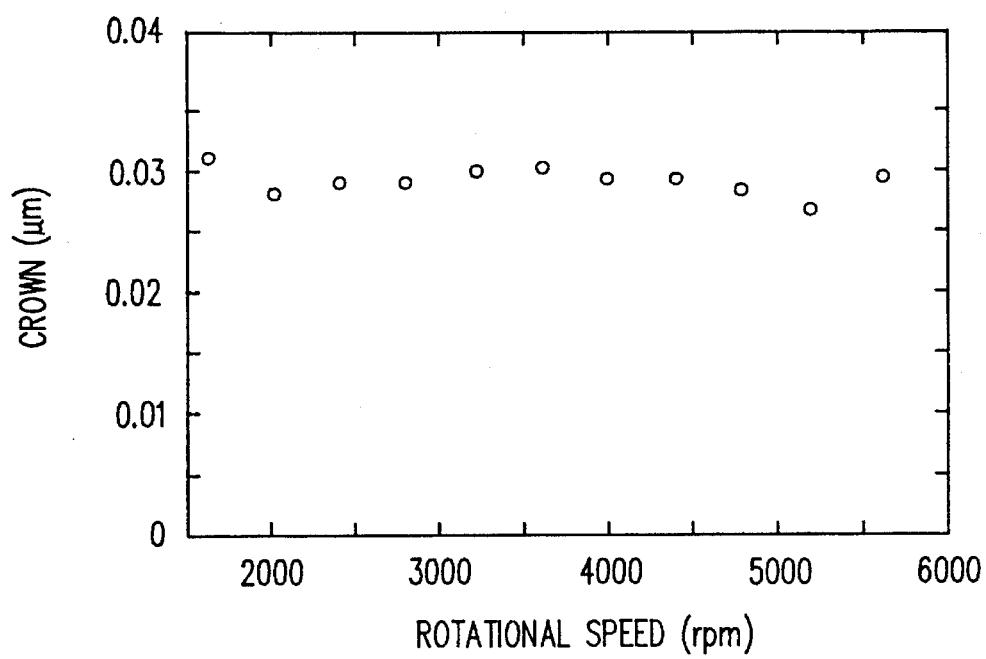
FIG. 15 is a diagram showing the correlation between crown and disk rotational speed.

FIG. 14 shows an example of flying height measurement according to this method, in which case the flying height of the gap section was measured while the rotational speed of the fused quartz disk was varied. Compared with the measurement by the conventional method shown in FIG. 2, the characteristic curve by this method is smoother, and there appears to be no phenomenon of reversal such as the flying height falling as the rotational speed rising. FIG. 15 shows the dependence of slider crowns on rotational speed, the characteristics of which are calculated by using the algorithm of this embodiment at the same time as the acquisition of data shown in FIG. 14. Compared with the case shown in FIG. 3, which was determined by the conventional method, the crowns calculated by applying this algorithm have been determined accurately at their proper original constancy.

The superiority of the new method consists in its flexibility toward parameter fluctuation, its adaptability to low flying height measurement, and its higher calculation speed.

Whereas the conventional one-point measurement method had difficulty in measuring flying heights lower than a several wavelengths, the new method according to the preferred embodiment enables accurate measurement of even such a low flying height range on account of its utilization of the consistency of all head slider profile data.

The calibration program identifies not individual flying heights above the disk but a coefficient vector b used for polynomial approximation of a flying height profile on a two-dimensional space slider position u, disk rotational speed v together with the above-mentioned unknown parameters by nonlinear regression.

While a preferred and an alternative embodiment of the present invention have been illustrated, it should be apparent that modifications and adaptations to these embodiments may occur to one skilled in the art without departing from the scope of the present invention as set forth in the following claims.

We claim:

1. A method for measuring the flying height of a magnetic device above a disk surface, comprising the steps of:

illuminating a gap, the width of the gap corresponding to said flying height, between said magnetic device and said disk surface, with a source of light;

measuring, at three wavelength, the actual intensity of interference light caused by reflections across said gap from said magnetic device and said disk surface;

calculating a theoretical intensity of interference light, said theoretical intensity of interference light being dependent upon the width of said gap;

calculating the error between said actual intensity and said theoretical intensity; and, recalculating the theoretical intensity so as to minimize said error, whereby the width of said gap is determined.

2. A method according to claim 1 wherein the step of calculating a theoretical intensity comprises selecting a first refraction coefficient and a first extinction coefficient.

3. A method according to claim 2 wherein the step of recalculating the theoretical intensity comprises selecting a second refraction coefficient and a second extinction coefficient.

4. A method according to claim 1 wherein a least square method is used to calculate the error between said actual intensity and said theoretical intensity.

5. A method according to claim 1 further comprising the step of correcting distortion in the actual intensity subsequent to measuring the actual intensity and prior to calculating the error.

6. A method according to claim 2 wherein the step of calculating a theoretical intensity of interference light comprises solving the equation:

$$g(\lambda, \chi) = \left| \frac{r_{12} + r_{23}e^{-2i\phi}}{1 + r_{12}r_{23}e^{-2i\phi}} \right|^2$$

-continued wherein, $$\phi = \frac{2\pi\chi}{\lambda} n_2\cos\theta_2$$

and, $$r_{12} = \frac{K_{1\chi} - K_{2\chi}}{K_{1\chi} + K_{2\chi}}$$

and, $$r_{23} = \frac{K_{2\chi} - K_{3\chi}}{K_{2\chi} + K_{3\chi}}$$

and, $$K_{j\chi} = \frac{\omega}{c} n_j\cos\theta_j$$

$(j = 1, 2, 3)$ wherein $n_1$ is the refraction coefficients of a fused quartz disk, $n_2$ is the refraction coefficients of an air gap, and $n_3$ is the refraction coefficients of a magnetic head, $\lambda$ is light wavelength, c is light velocity, $\omega$ is angular frequency of incident light, $r_{12}$ is reflection factor at a disk/air interface, $r_{23}$ is reflection factor at a air/magnetic head interface, $\theta_1$ is an angle at which an incident ray enters the air gad from the fused quartz disk, $\theta_2$ is an angle at which the incident ray is refracted in the air gap, $\theta_3$ is an angle at which the incident ray enters the magnetic head from the air gap, and $K_{jx}$ denotes x-component of a light wave vector.

* * * * *